Nov. 14, 1950  W. R. SCHARSCH  2,529,850
BUTTER SLICING AND DISPENSING MACHINE
Filed March 29, 1945  15 Sheets-Sheet 1
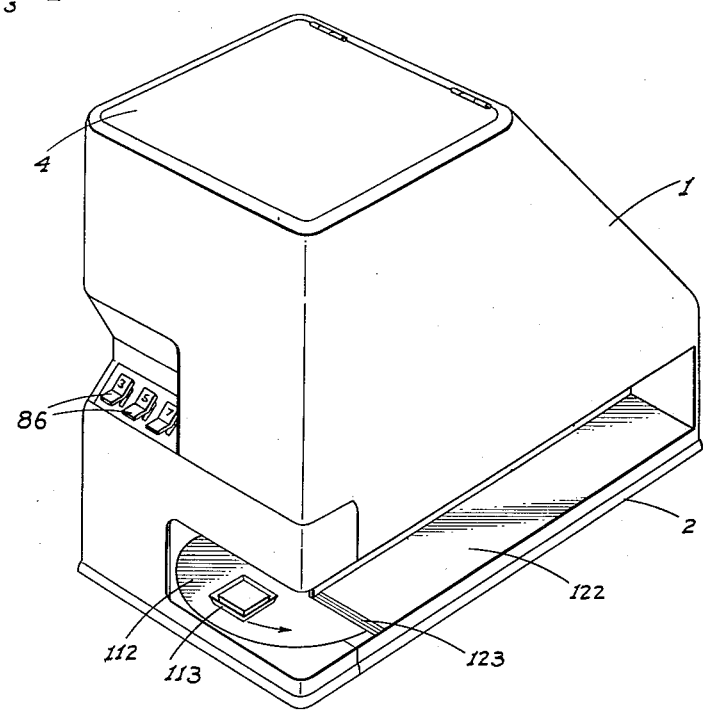
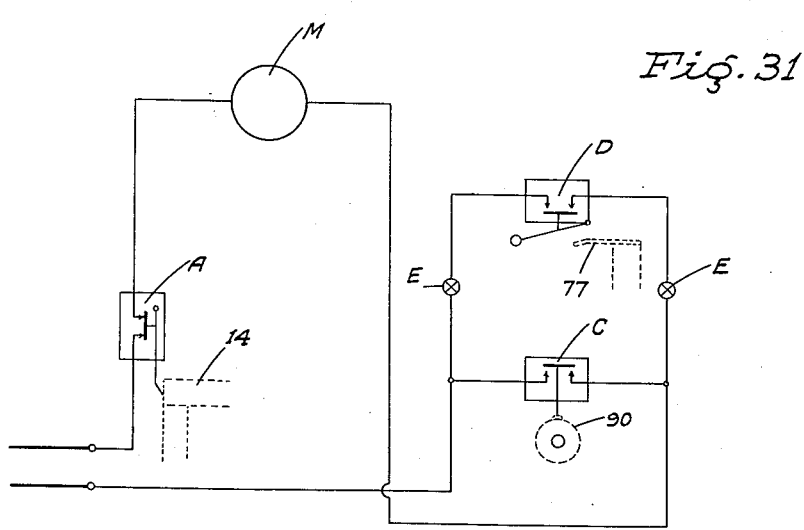
INVENTOR
W. R. Scharsch
BY  *Webster & Webster*
ATTORNEYS Nov. 14, 1950     W. R. SCHARSCH     2,529,850
BUTTER SLICING AND DISPENSING MACHINE Filed March 29, 1945     15 Sheets-Sheet 2

INVENTOR
W. R. Scharsch
BY
ATTORNEYS

Nov. 14, 1950 W. R. SCHARSCH 2,529,850
BUTTER SLICING AND DISPENSING MACHINE
Filed March 29, 1945 15 Sheets-Sheet 3

INVENTOR
W. R. Scharsch
BY
ATTORNEYS

Nov. 14, 1950 — W. R. SCHARSCH — 2,529,850
BUTTER SLICING AND DISPENSING MACHINE
Filed March 29, 1945 — 15 Sheets-Sheet 4

INVENTOR
W. R. Scharsch
BY
ATTORNEYS

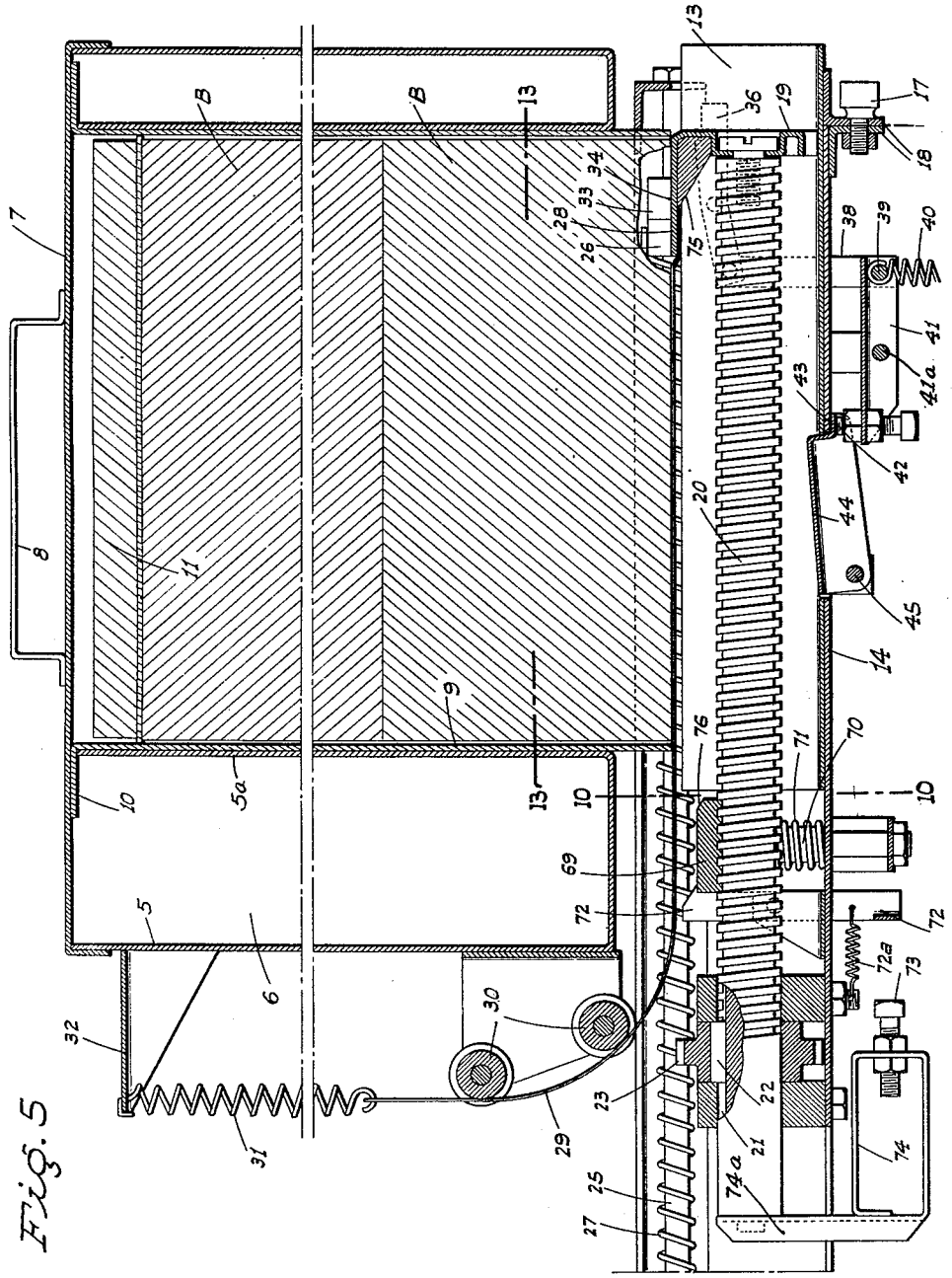

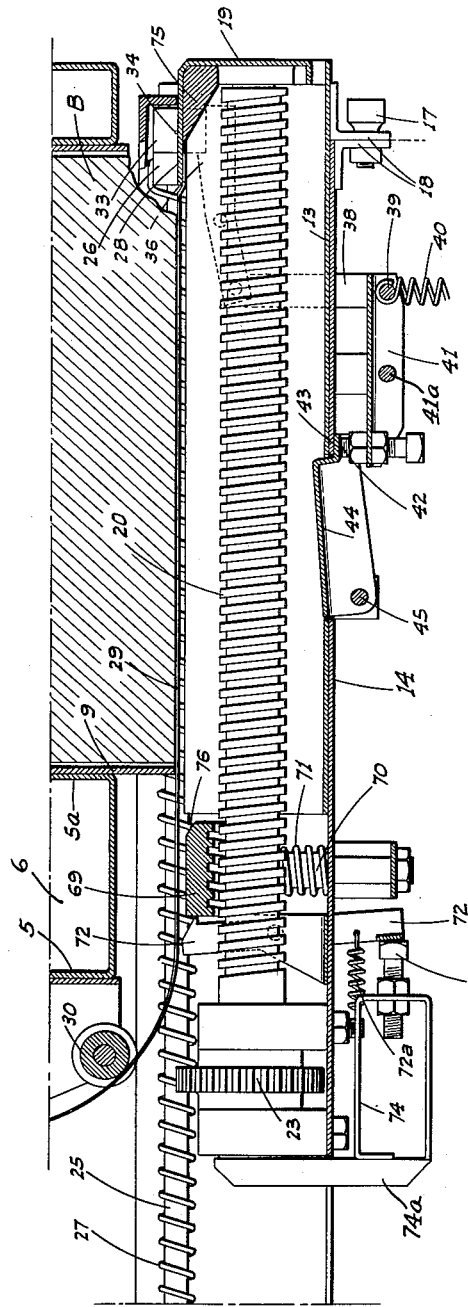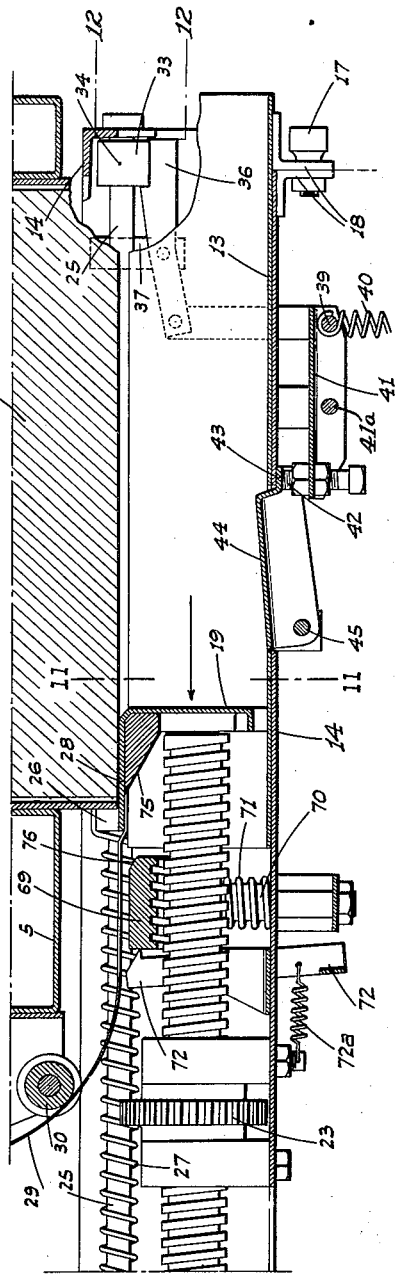

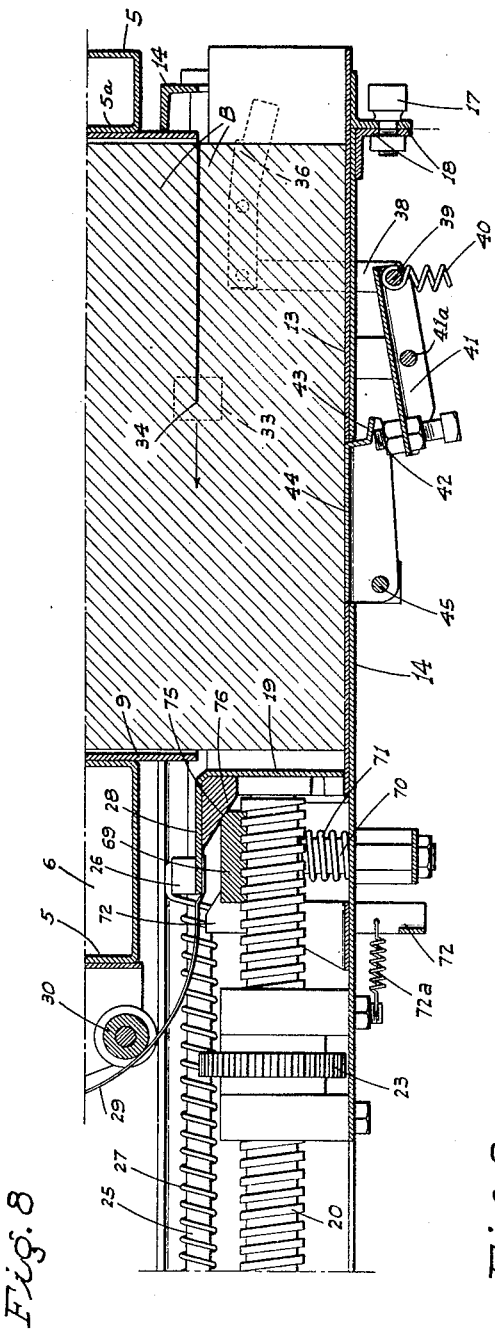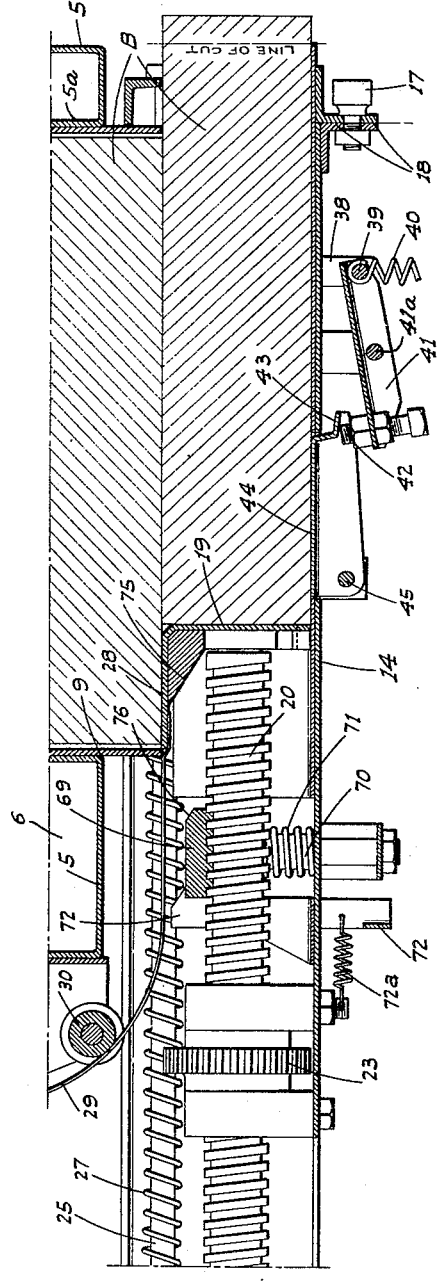

Nov. 14, 1950 W. R. SCHARSCH 2,529,850
BUTTER SLICING AND DISPENSING MACHINE
Filed March 29, 1945 15 Sheets-Sheet 8

INVENTOR
W. R. Scharsch
BY
ATTORNEYS

Nov. 14, 1950  W. R. SCHARSCH  2,529,850
BUTTER SLICING AND DISPENSING MACHINE
Filed March 29, 1945  15 Sheets-Sheet 9
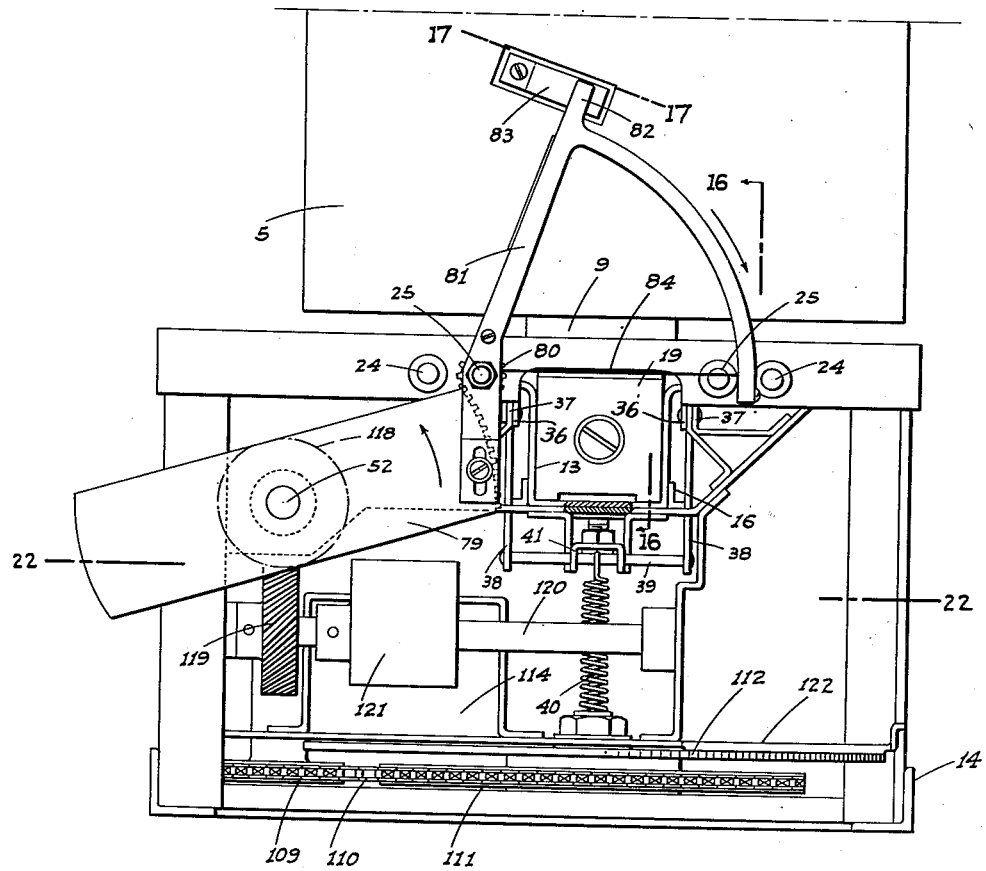
Fig. 14
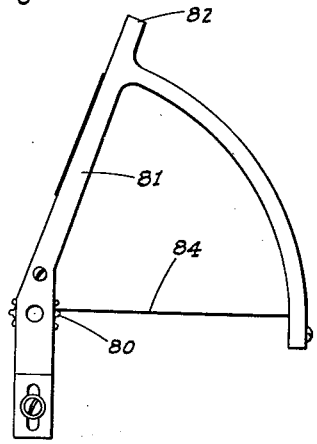
Fig. 15
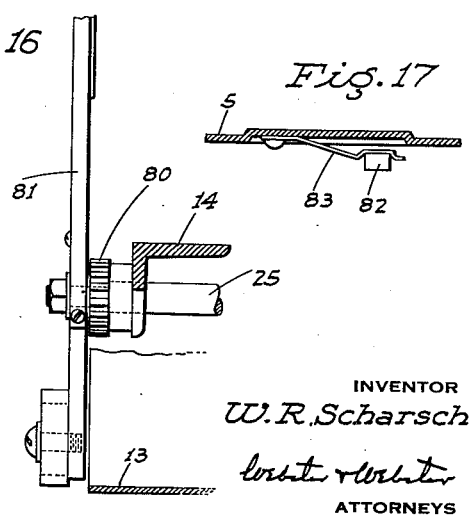
Fig. 16
Fig. 17
INVENTOR
W. R. Scharsch
ATTORNEYS INVENTOR
W. R. Scharsch Nov. 14, 1950  W. R. SCHARSCH  2,529,850
BUTTER SLICING AND DISPENSING MACHINE
Filed March 29, 1945  15 Sheets-Sheet 11

INVENTOR
W. R. Scharsch
BY
ATTORNEYS

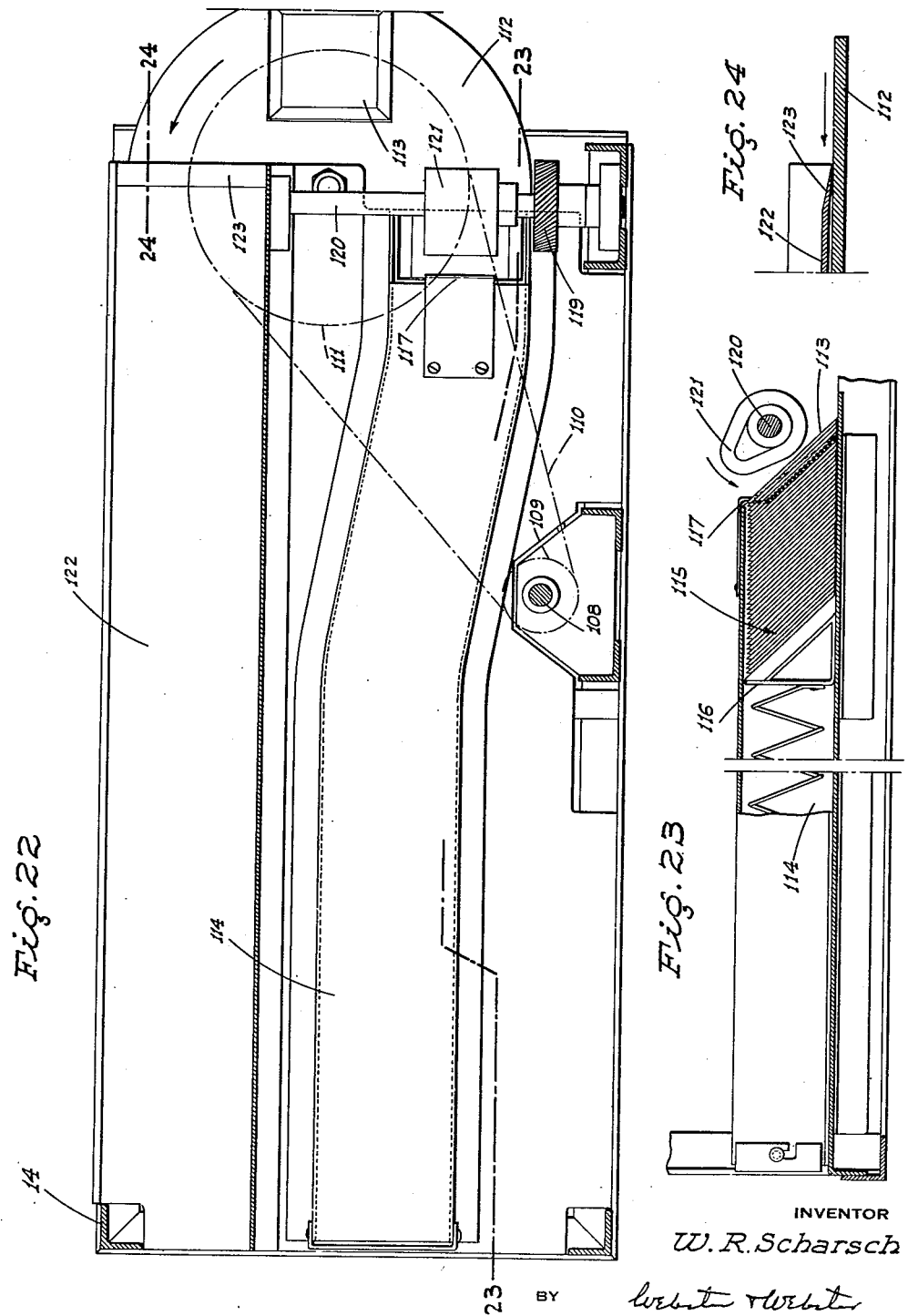

Nov. 14, 1950 — W. R. SCHARSCH — 2,529,850
BUTTER SLICING AND DISPENSING MACHINE
Filed March 29, 1945 — 15 Sheets-Sheet 13

INVENTOR
W. R. Scharsch
BY
ATTORNEYS

Nov. 14, 1950 W. R. SCHARSCH 2,529,850
BUTTER SLICING AND DISPENSING MACHINE
Filed March 29, 1945 15 Sheets-Sheet 14

INVENTOR
W. R. Scharsch
BY Webster & Webster
ATTORNEYS

Nov. 14, 1950  W. R. SCHARSCH  2,529,850
BUTTER SLICING AND DISPENSING MACHINE
Filed March 29, 1945  15 Sheets—Sheet 15
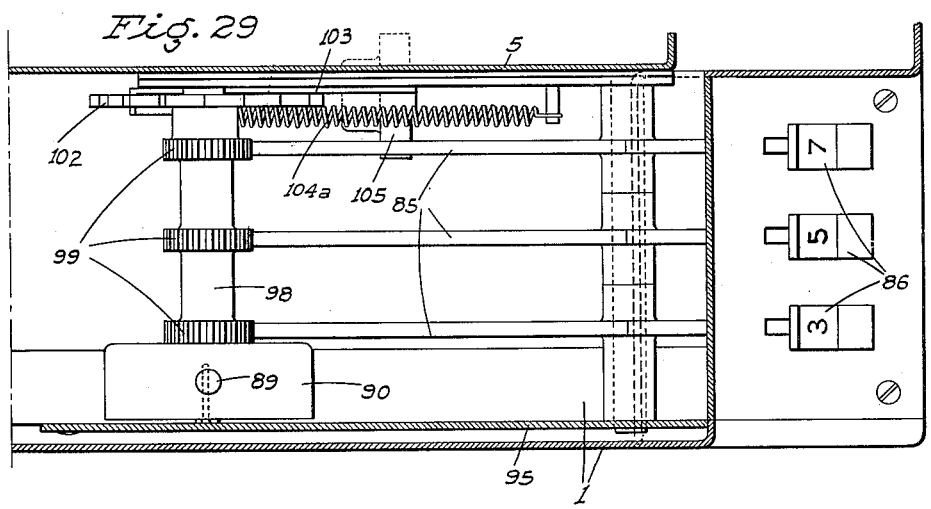
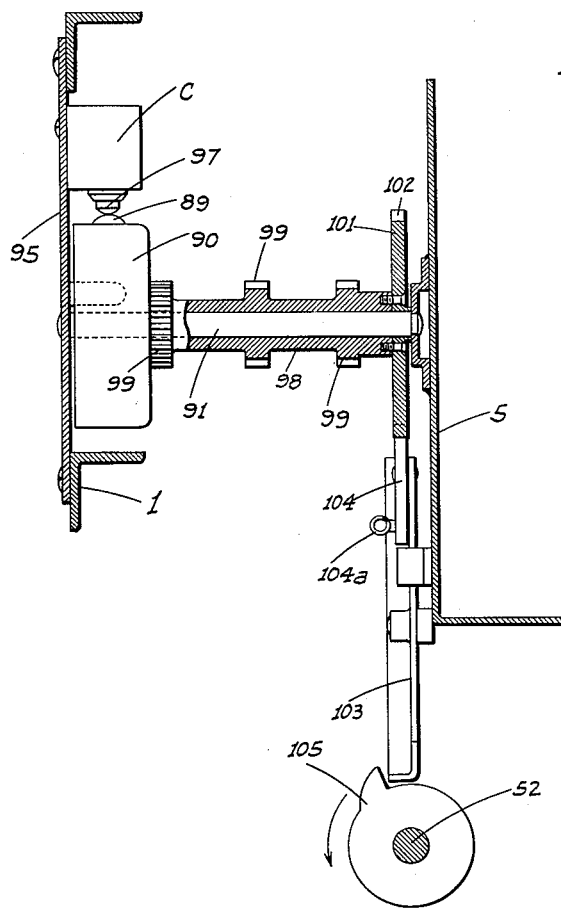
INVENTOR
W. R. Scharsch
BY
ATTORNEYS Patented Nov. 14, 1950

2,529,850

UNITED STATES PATENT OFFICE 2,529,850

BUTTER SLICING AND DISPENSING MACHINE

Walter R. Scharsch, Los Angeles, Calif.

Application March 29, 1945, Serial No. 585,447

12 Claims. (Cl. 31—6)

This invention relates to dispensing machines and particularly to a machine for slicing and dispensing butter. The machine is particularly adapted for use in public eating places where the butter is sliced and dispensed to the patrons with their meals.

The primary object of the invention is to produce a machine which will automatically slice the butter into appropriate sized slices or pats, place the same upon individual trays, and then position the trays for handling by the persons serving the meals and to do all of this without the necessity of the servers in any way handling the butter either individually or out of receptacles as is now the common practice.

Another object of the invention is to provide a means whereby any desired number of slices or pats may be cut or delivered at one time according to the number of persons being served.

A further object of the invention is to provide in connection with the slicing and dispensing means a refrigerating means for keeping the butter firm until it is ready to be sliced and dispensed.

A still further object of the invention is to provide a mechanism which may be readily disassembled for cleaning or repairing.

A final object of the invention is to render the same completely automatic and so that all that is necessary for the operator to do to secure the desired number of slices properly dispensed is to press a key or a combination of keys adding up to the number of slices or pats desired at any one time.

These objects are accomplished by means of such structure and relative arrangement of parts as will fully appear by a perusal of the following specification and claims.

In the drawings similar characters of reference indicate corresponding parts in the several views:

Figure 1 is a perspective view of the complete machine.

Figure 5 is a fragmentary sectional elevation showing the position of the bulk butter separating wire, and the butter advancing plunger and showing the latter in the position it assumes before bulk butter is to be fed into the butter slicing chamber.

Figure 6 is a similar view with the plunger advanced slightly from the position shown in Fig. 5 and showing the release of the screw shaft from the advance-control holding nut.

Figure 7 is a similar view to that of Fig. 6 but showing the plunger as partly retracted to the butter advancing position, and showing the bulk butter separating wire held against movement prior to the dropping of the mass of bulk butter into the butter slicing chamber.

Figure 8 is a similar view showing the plunger fully retracted and in position for a butter advancing stroke, and with the bulk butter separating wire moving through the mass of bulk butter after the latter has dropped into the butter slicing chamber.

Figure 9 is a similar view showing the plunger in the position it assumes as it advances against the separated piece of butter and with the latter advanced to slicing position.

Figure 14 is a fragmentary front end view of the butter slicing mechanism and its mounting frame as disassociated from the main frame and casing.

Figure 15 is an elevation of the slicing-wire support, detached.

Figure 16 is a fragmentary longitudinal section, on line 16—16 of Fig. 14.

Figure 17 is a fragmentary sectional plan on line 17—17 of Fig. 14.

Figure 22 is a sectional plan of the removable mechanism-mounting frame, taken in substantially the horizontal plane of line 22—22 of Fig. 14.

Figure 23 is a foreshortened longitudinal section on line 23—23 of Fig. 22 showing the sliced butter tray feeding means.

Figure 24 is a fragmentary longitudinal section on line 24—24 of Fig. 22.

Figure 29 is a sectional plan on line 29—29 of Fig. 25.

Figure 30 is a cross section on line 30—30 of Fig. 25.

Figure 31 is a diagram of the electric circuit.

Figure 2:
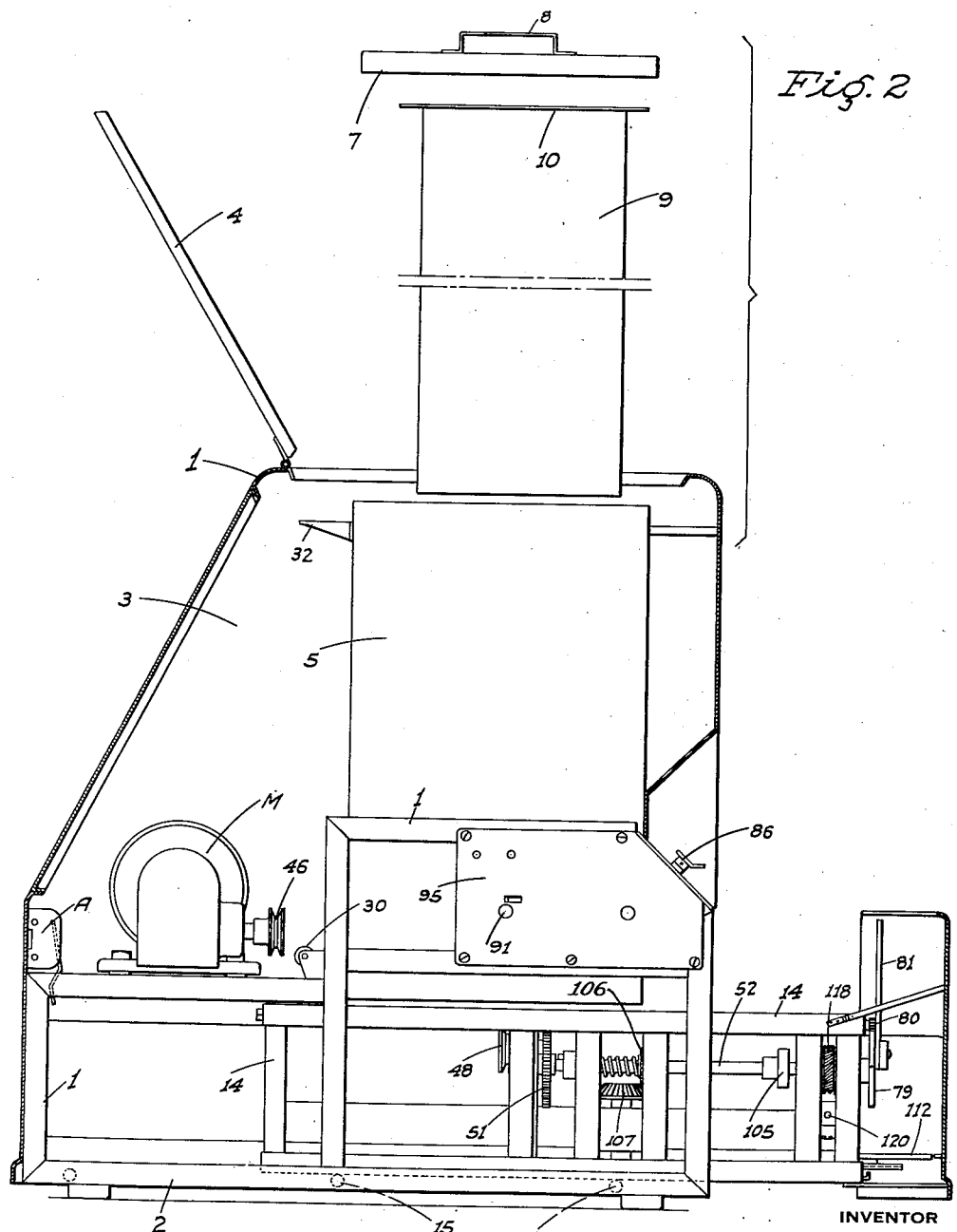
Figure 2 is a side elevation with the casing in section, and showing the bulk butter holding receptacle removed and disposed above the ice compartment and also showing the butter cutting mechanism mounting frame partly wihdrawn.

Referring now more particularly to the characters of reference on the drawings, the numeral 1 provides an outside or main casing and frame unit within which the operating mechanism of the device is enclosed. This frame is rigid in construction and has a base 2 for placement of the machine on a counter, table or other place convenient to its operation.

The frame 1 at its upper end comprises a compartment 3 topped by a hinged cover 4.

Fixed within the compartment 3 is an ice box comprising an outer wall 5 and a spaced inner wall 5a forming an outer ice compartment 6 and a central compartment 6a. A cover 7 having a handle 8 is provided for ready insertion over the compartments 6 and 6a.

Arranged to fit snugly within the interior of the compartment 6a is a bulk butter container 9 having overhanging flanges 10 adapted to engage the top edge of the inner wall 5a of the icebox in order to properly locate the butter container within the icebox and so that it will properly fit other operating parts of the machine as will hereinafter be described.

The container 9 is preferably rectilinear in cross section and of a size and form to receive one or more pieces of butter B which are of like rectilinear form, said pieces being adapted to be fitted into the container in edge to edge relation as shown particularly in Fig. 5.

When the butter is in the container, there is a weight 11 adapted to fit on the top thereof, which weight tends to move the butter downwardly through such container, or if desired a yieldable compression plunger of some type might be used in lieu of the weight.

The interior of the container 9 is formed with a plurality of upstanding inwardly facing ribs 12 against which the sides of the butter pieces slide in order to render the downward movement of the same easier than if the sides of such butter pieces were in continuous contact with the inside walls of the container.

Figure 11:
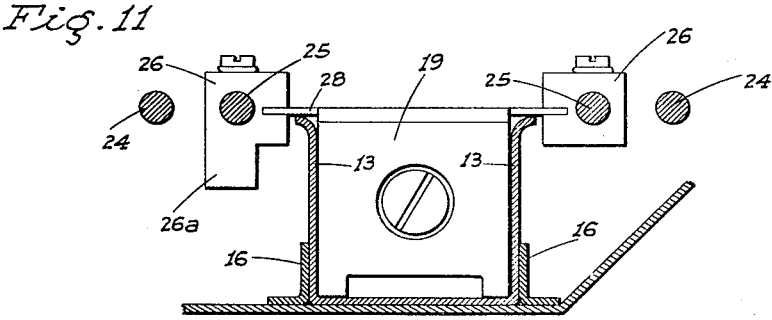
Figure 11 is a fragmentary cross section on line 11—11 of Fig. 7.
Figure 12:
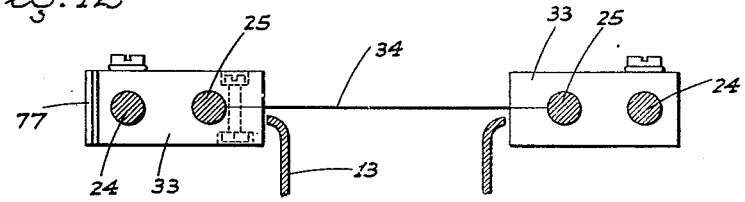
Figure 12 is a fragmentary cross section on 12—12 of Fig. 7 showing the mounting of the horizontal bulk butter separating wire.
Figure 13:
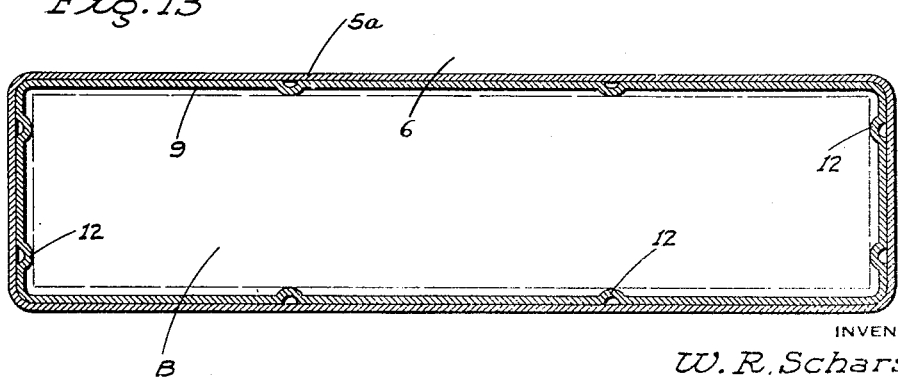
Figure 13 is a sectional plan of the butter container on line 13—13 of Fig. 5.
Figure 18:
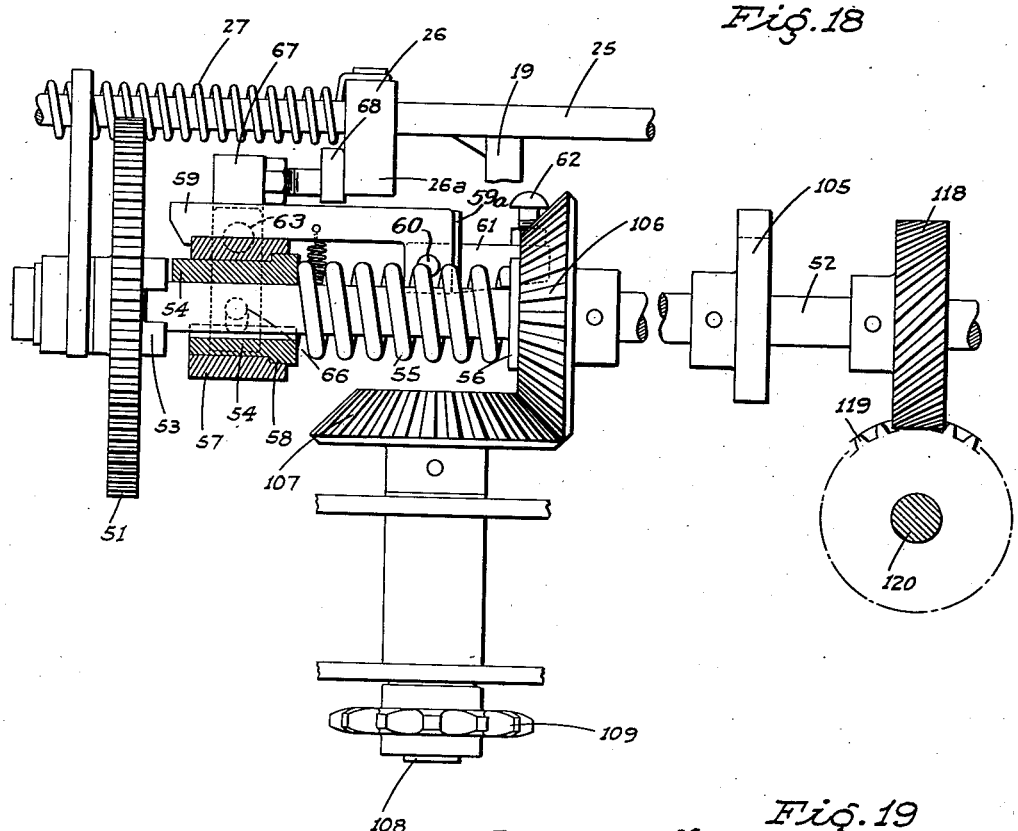
Figure 18 is a side elevation, partly in section, of the mechanical movement-controlling unit of the machine, showing the clutch as disengaged upon the limit of retractive movement of the butter engaging plunger.
Figure 19:
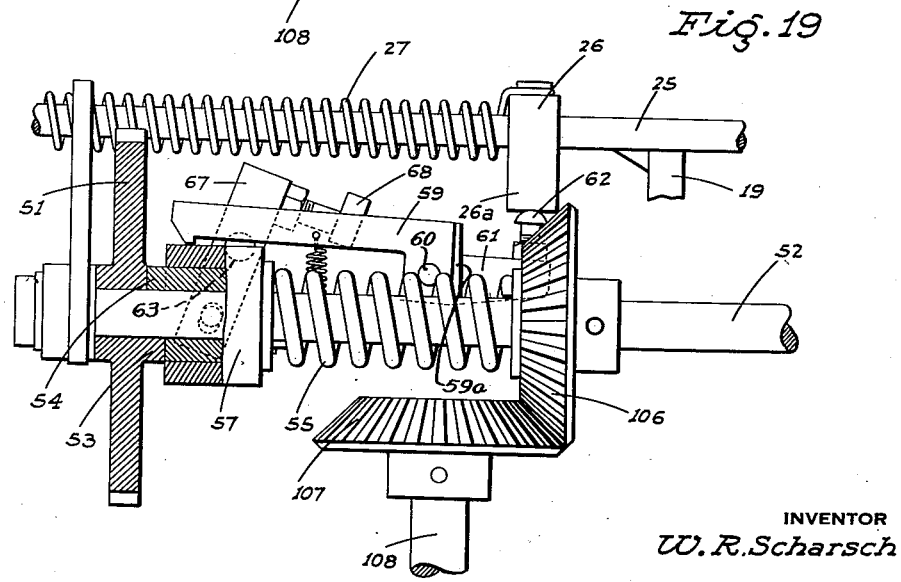
Figure 19 is a similar view showing the clutch after becoming engaged upon advancing movement of the plunger a predetermined distance from its limit of retractive movement.
Figure 20:
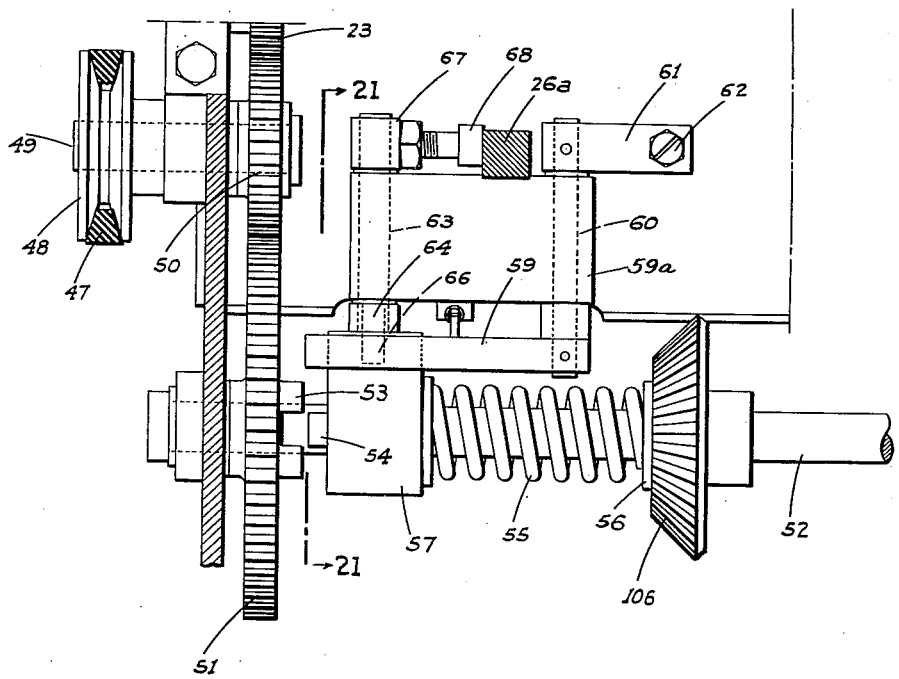
Figure 20 is a top plan view of the unit shown in Fig. 18 with the clutch disengaged.
Figure 21:
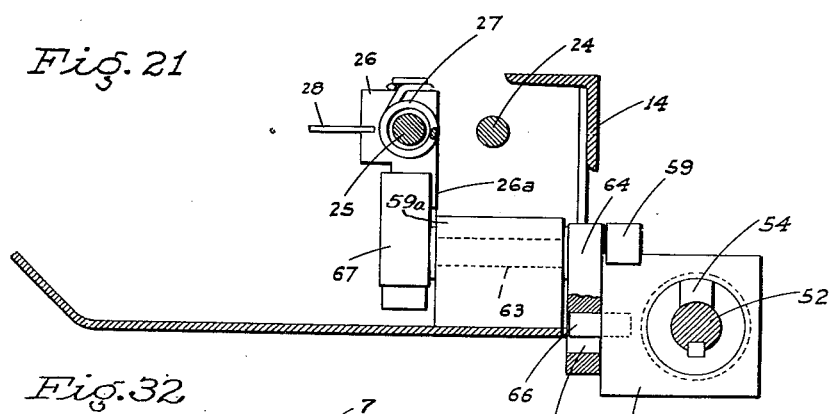
Figure 21 is a cross section on line 21—21 of Fig. 20.
Figure 32:
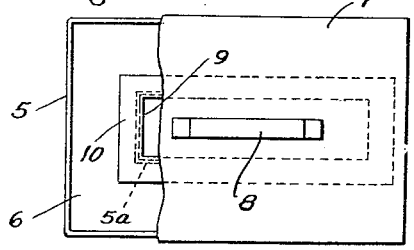
Figure 32 is a top plan view of the ice box and bulk butter container partly broken out to show the relative positions of the ice and butter compartments therein.

Immediately below the bottom edge of the container 9 and generally conforming thereto, in transverse cross-sectional dimensions, is a butter cutting chamber 13. (See Figs. 5 and 11). The total cross sectional dimensions of this chamber 13 are substantially equal to the size in which butter is usually sliced into pats for service. The upper side of the cutting chamber 13 is open and in register with the bottom of the container 9 which is also open.

The chamber 13 is slidably disposed within a sub-frame 14 which in turn is slidably disposed within the bottom portion of the main frame 1. Rollers 15 are provided between the bottom of the sub-frame 14 and the main frame so that the sub-frame which carries most of the operating mechanism of the device may be readily inserted into and removed from the main frame for cleaning and repair purposes.

The cutting chamber 13 is guided into position by guide flanges 16 and is removably positioned within the sub-frame by means of thumb screws 17 which engage between cooperating flanges 18 mounted respectively on the chamber 13 and sub-frame 14.

The forward end of the cutting chamber 13 projects to a point beyond the container 9 and beyond the sub-frame 14 as shown in Figs. 5, 8 and 9 so as to provide a cutting edge for cooperation with a butter slicing wire hereinafter described.

Mounted within the cutting chamber 13 and for longitudinal movement along and through the length thereof, is a plunger 19. The plunger is provided with a propelling screw 20. The screw 20 at its inner end is provided with a key way 21 engaged by a key 22 on a gear 23 suitably driven from the motor M (see Figs. 3 and 4) in a manner hereinafter described.

Spaced on each side of the chamber 13 are a pair of horizontally disposed rods 24 and 25 respectively, which rods extend the full length of the sub-frame 14.

Slidable on the rods 25 are blocks 26 and interposed between these blocks and the rear ends of the rods 25 are tension springs 27. The blocks 26 are connected with the plunger 19 by a cross bar 28.

Connected to the cross bar 28 by any suitable means such as welding or the like is a divider curtain 29 which is of a width to cover the top of the slicing chamber 13 when the plunger is at its forward position as shown best in Figs. 5 and 6. Said curtain 29 extends horizontally in a plane just above the plane of the top edge of the chamber 13 and then extends under idler rollers 30 to a connection with a tension spring 31 fixed to a bracket 32, preferably extending from the icebox 5. It will be apparent therefore, that when the plunger is on its forward position the curtain 29 separates the open lower end of the container 9 from the open side of the slicing chamber 13 and when the plunger is in its retracted position the container 9 is in direct open communication with such slicing chamber 13. While the curtain 29 is extended over the chamber 13, the tension of the spring 31 is sufficient to hold such curtain taut against the weight of the butter B in the compartment 6a.

Slidably mounted on both the rods 24 and 25 are blocks 33. These blocks are disposed forwardly of and engageable by the blocks 26 and there is a cutting wire 34 stretched between the blocks and adapted to move horizontally across the open top of the slicing chamber 13 with rearward movement of said blocks 33 on the rods. Tension springs 35 are interposed between the blocks 33 and the rear end of the rods 24.

Figure 3:
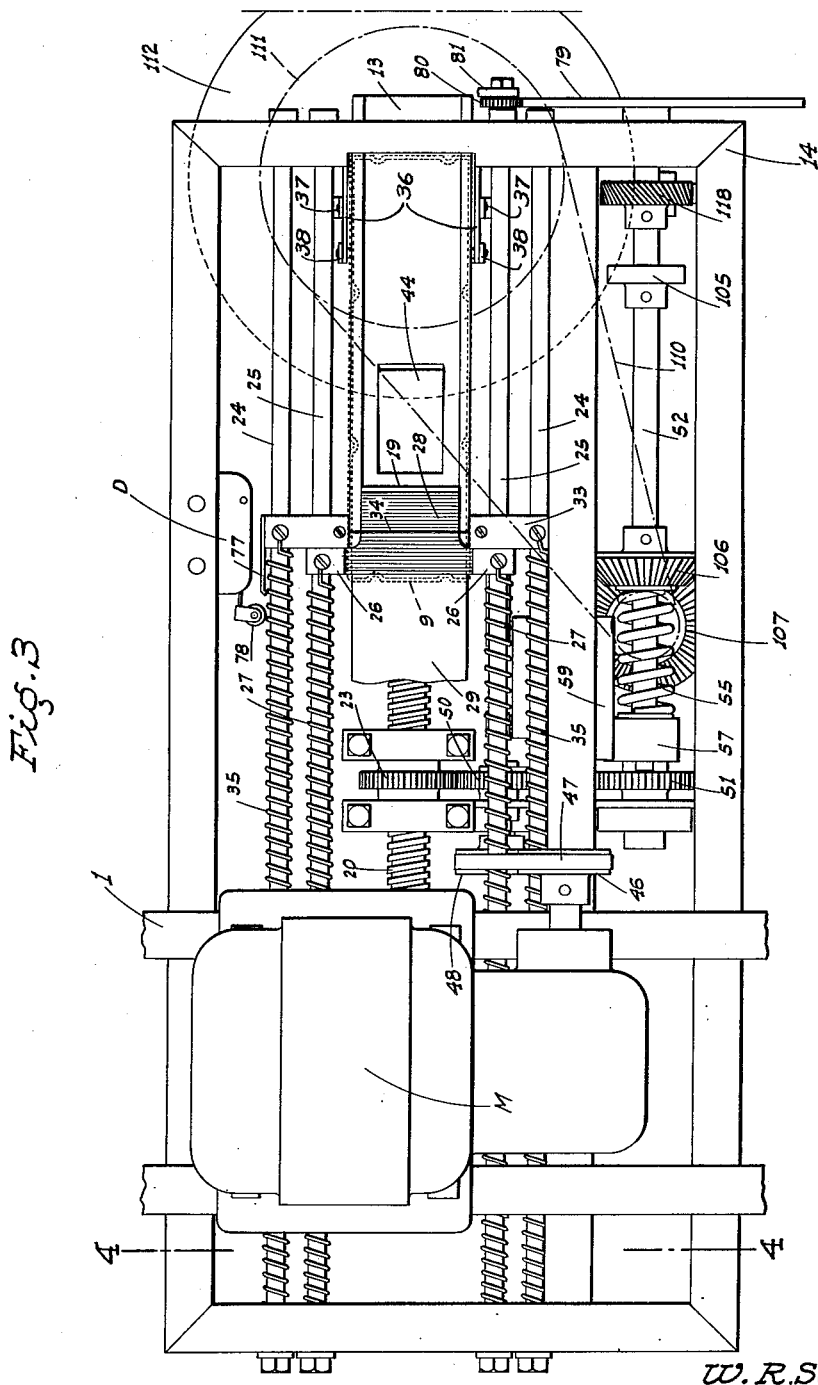
Figure 3 is a top plan view of said mounting frame and its mechanism shown as disassociated from the main frame and the enclosing casing, except for that portion sustaining the drive motor.
Figure 4:
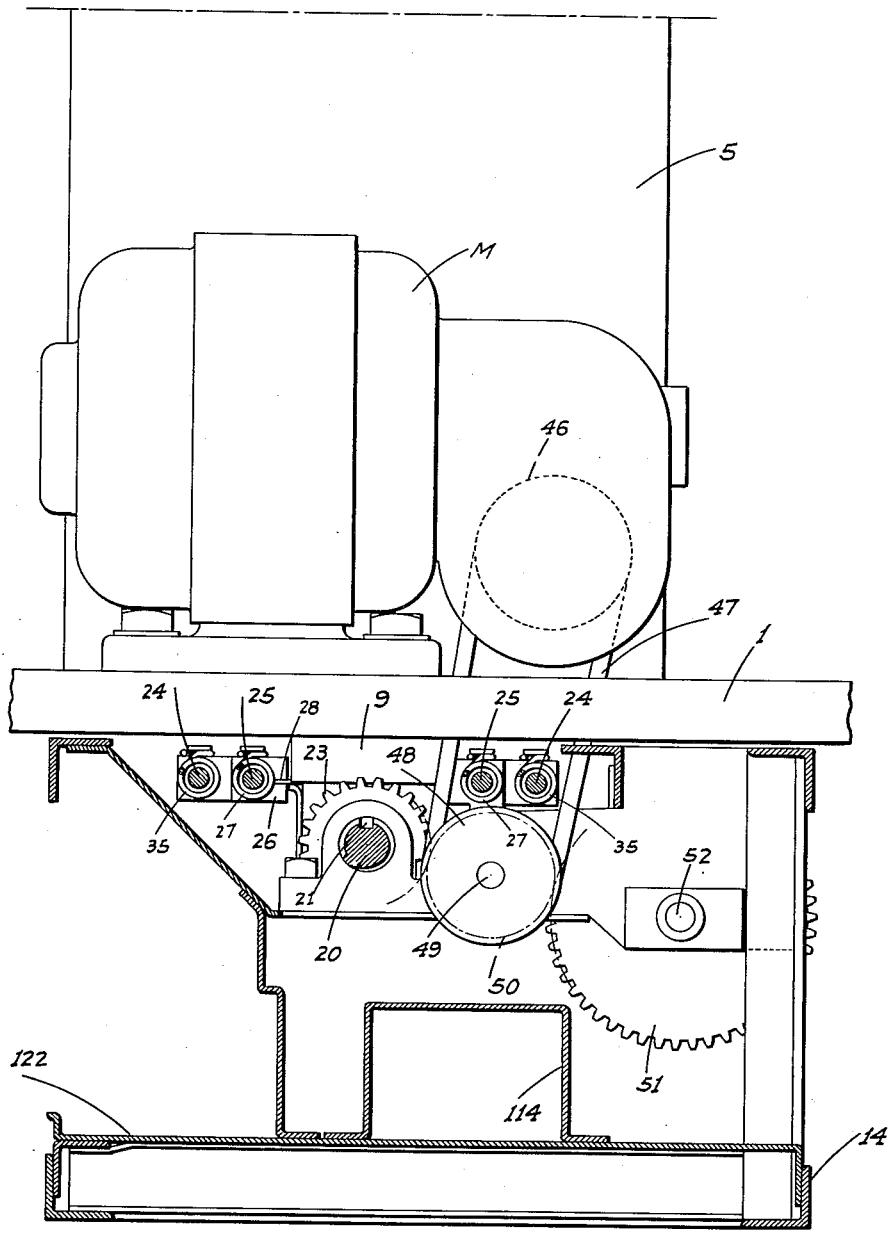
Figure 4 is a transverse section on line 4—4 of Fig. 3.
Figure 10:
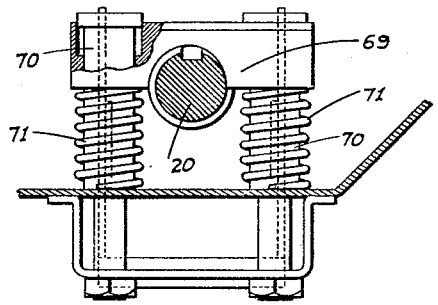
Figure 10 is a fragmentary cross section on line 10—10 of Fig. 5.

By reference to Fig. 3 it will be seen that when both the blocks 26 and 33 are held in retracted position by their respective springs 27 and 35 the blocks 33 are held in contact with the blocks 26. With forward movement of the blocks 26 the blocks 33 will therefore likewise be pushed forward. When the blocks 33 reach their limit of forward movement they will be engaged and held in such forward position by means of detents 36 pivoted on brackets 37 on the sub-frame 14, the detents being thereafter releasable in a manner to be hereinafter described. On the inner ends of these detents are links 38 connected at their lower ends below the slicing chamber 13 by a pin 39. A tension spring 40 is interposed between the pin 39 and the bottom of the sub-frame and acts to hold the detents in contact with the blocks 33.

A short lever 41 is pivoted at 41a below the slicing chamber 13 and one end thereof is connected with the pin 39 while the other end makes contact through the medium of an adjustment screw 42 with a lip 43 on a trip plate 44. This trip plate is pivoted at 45 below the slicing chamber 13. Under the influence of the spring 40 acting on the lever 41 the adjustment screw 42 acts on the lip 43 to project the trip plate 44 through an opening in the bottom of the slicing chamber and to a point slightly above such bottom as shown quite clearly in Figs. 6 and 7. It will be obvious that a depression of the trip plate 44 will act on the lever 41 to press upwardly on the links 38 and release the detents 36 from engagement with the blocks 33 whereupon the spring 35 will tend to draw said blocks rearwardly along the rods 24 and 25.

Figure 25:
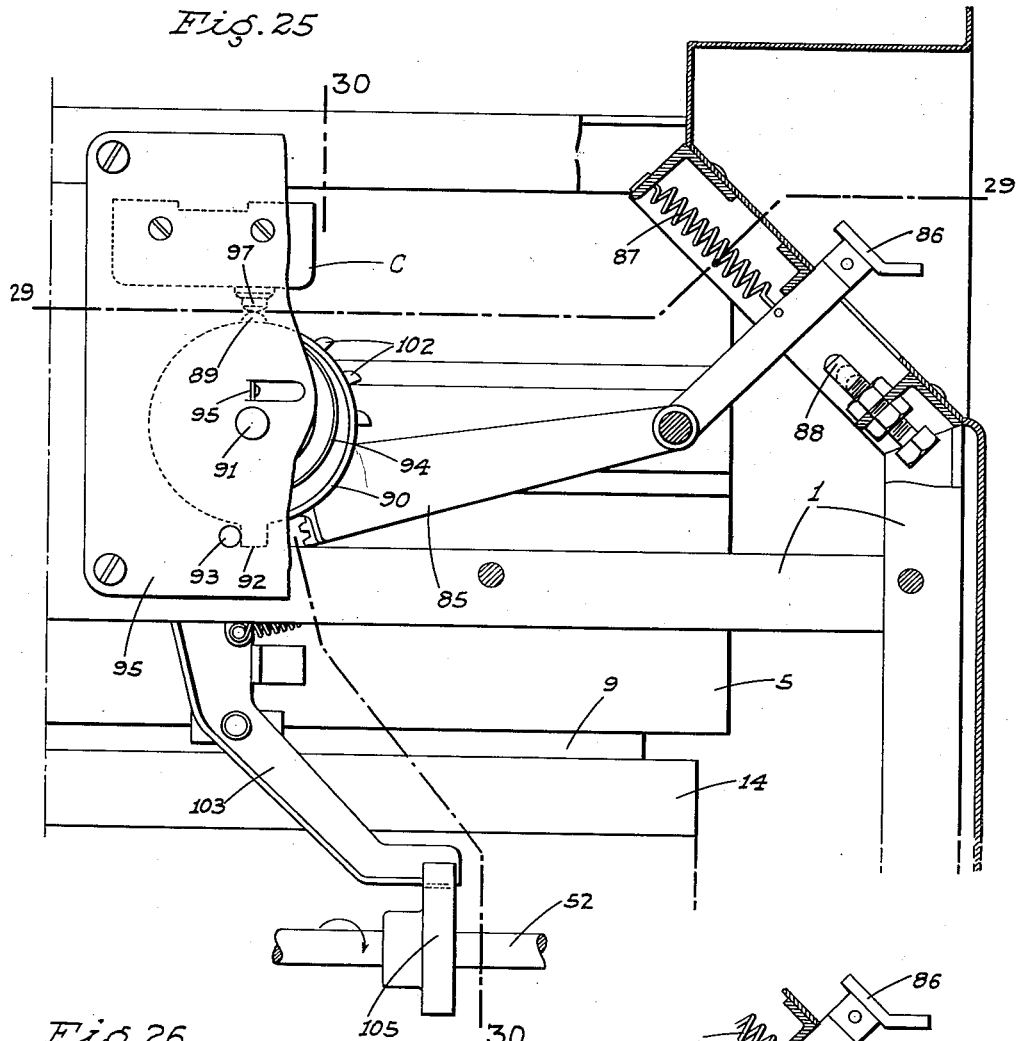
Figure 25 is a fragmentary side elevation, of the main frame structure of the machine, partly broken away and in section, showing the manual control unit of the machine in an inactive or neutral position.
Figure 26:
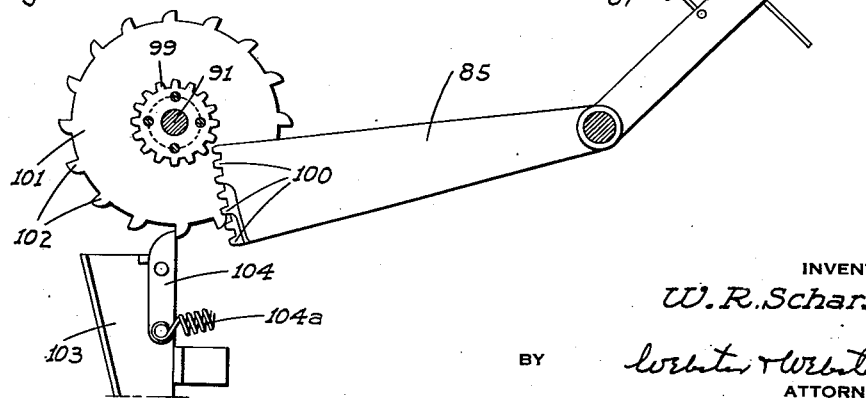
Figure 26 is a fragmentary side elevation of the finger levers and adjacent cooperating parts, in the same position as in Fig. 25.
Figure 27:
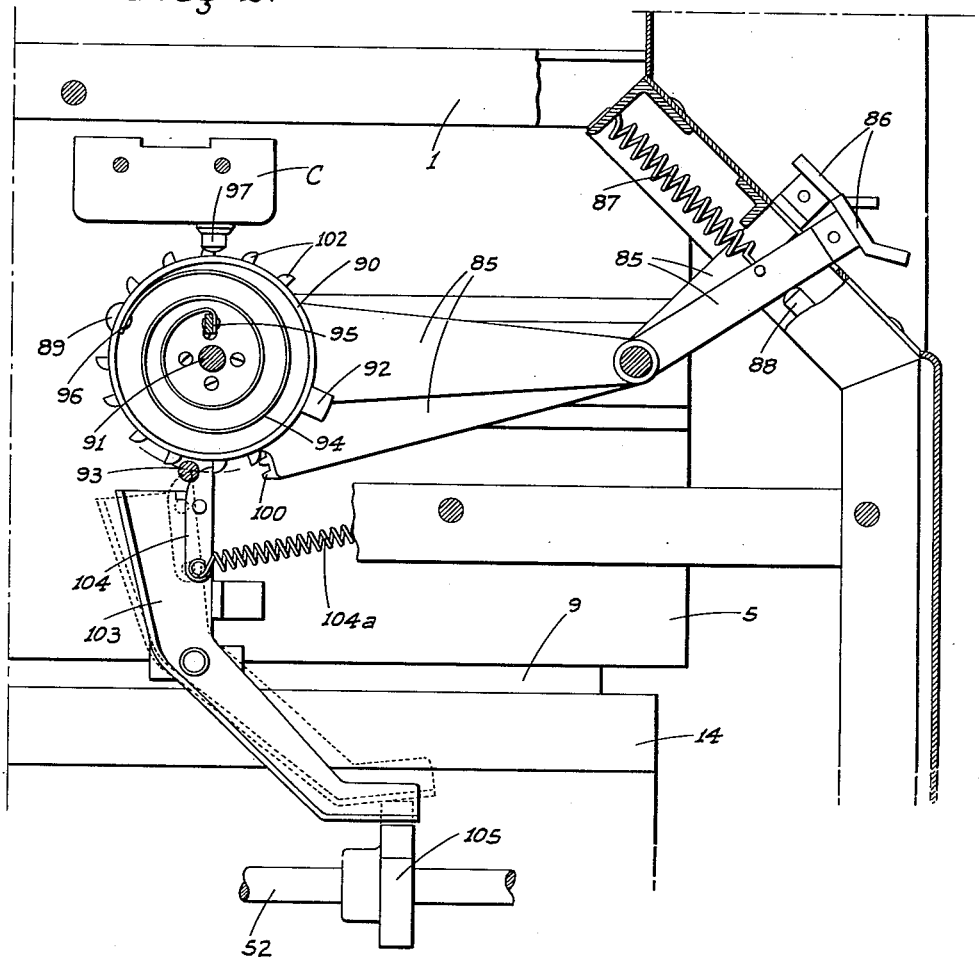
Figure 27 is a view similar to Fig. 25 showing one finger lever depressed.
Figure 28:
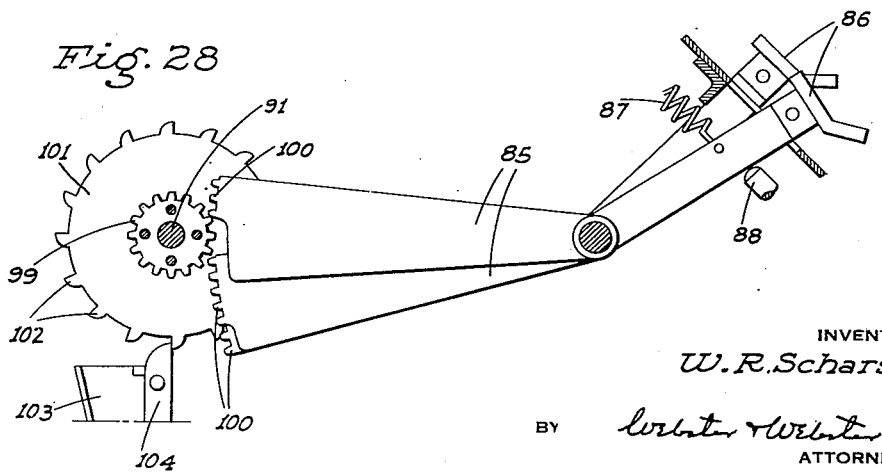
Figure 28 is a view similar to Fig. 26, showing the position of the finger levers relative to their cooperating gears corresponding to Fig. 27.

The motor M is permanently located in the main housing 1. It is operated through the medium of an electric circuit shown diagrammatically in Fig. 31. In this circuit are three control switches, A, D, and C. The location of these switches in the apparatus are to be found as follows:

The switch A may be observed in Fig. 2, the switch D in Fig. 3 and the switch C in Figs. 25, 27 and 30.

The switch A is normally held closed by the rear end of the sub-frame 14 when the sub-frame is located in working position within the main frame 1. When the sub-frame 14 is withdrawn from the main frame as indicated in Fig. 2, it moves away from the switch A which thereupon operates and opens the main circuit to the motor so that there will be no opportunity for the motor to start in motion when the operating parts have been withdrawn with the sub-frame.

The motor M through suitable gear connections, not shown, drives a pulley 46. From this pulley 46 a belt 47 drives a pulley 48 which is mounted on a shaft 49 journaled in the sub-frame 14. On the opposite end of the shaft 49 is a spur gear 50. This spur gear is an intermediate gear which meshes on one side with the gear 23 and on the other side with a gear 51 rotatably mounted on a shaft 52 journaled in the sub-frame 14.

On the face of the gear 51 is a clutch 53. A cooperating clutch 54 is slidably keyed on the shaft 52. A compression spring 55 is normally interposed between a collar 56 fixed on the shaft 52 and the clutch collar 54 and which spring tends to hold the clutch collar 54 in driving engagement with the clutch 53.

Rotatably mounted about the clutch collar 54 is another collar 57, the collars 54 and 57 having flanged engagement with each other at the rear end thereof as at 58.

A spring pulled detent 59 is mounted on a pin 60, which pin 60 is turnable through a suitable fixture 59a mounted in the sub-frame 14. On the opposite end of the pin 60 is a lever finger 61 having an upstanding strike lug 62.

Spaced rearwardly of the pin 60 is another pin 63 turnable in the same fixture 59a as is the pin 60. At its end adjacent the collar 57 the pin 63 carries a downwardly extending depending crank arm 64 provided with a slot 65. A pin 66 projects from the collar 57 into said slot. At its opposite end the pin 63 carries an upstanding crank arm 67 projecting rearwardly from which is a strike lug 68.

While the plunger 19 is moving forwardly during the butter cutting operation, the clutch collar 54 is in engagement with the clutch 53 so that the gear 51 is driving certain cooperating parts in a manner as will be later described.

When, however, the plunger 19 has completed its forward stroke and is released for retractive movement in the manner later described, one of the blocks 26 carries an extension 26a which engages the strike lug 68 and moves the crank arm 67 rearwardly and correspondingly moves the crank arm 64 forwardly. The latter then acts on the pin 66 to press the collar 57 forwardly and consequently likewise presses the collar 54 forwardly against the compression of the spring 55 and this disengages the cooperating clutch elements 54 and 53. Hence, until the plunger starts forward again, the cooperating part will not be driven by the gear 51, since the detent 59 has been pulled by its spring into holding engagement with the collar 57.

This movement of the detent however, has brought the strike lug 62 into the path of movement of the extension 26a. Consequently when the plunger starts forward again, the extension 26a engages the strike lug 62 and turns the detent on its pivot pin 60. This releases the detent from the collar 57 and the spring 55 whereupon returns the clutches 54 and 53 into driving relation.

The forward and retractive movement of the plunger 19 is imparted by movement of the gear 23 acting through its keyed connection with the screw 20 in cooperation with a fixed half-nut 69 which is interiorly threaded for threaded engagement with the threads of the screw 20.

This half-nut 69 is mounted for vertical sliding movement on upstanding pins 70 suitably mounted on the sub-frame 14 and between the frame and the half-nut are springs 71 tending to push the half-nut upwardly to carry its threads out of engagement with the threads of the screw. A pivoted spring pulled detent 72 engages the half-nut to hold its threads into register with the threads of the screw 20 during the period of desired forward movement of the plunger 19 so that as the screw 20 is rotated by the gear 23, such threaded engagement of the same with the half-nut 69 will advance the screw 20 and plunger 19 in a forward direction.

When the desired limit of forward movement of the plunger 19 has been reached, a strike lug 73 carried on a bracket 74 fixed to the rear end of the screw 20 by an arm 74a bolted to the end of the screw will engage the detent 72 and swing it on its pivot and out of engagement with the half-nut 69. Thereupon the springs 71 will push the half-nut 69 out of threaded engagement with the screw 20. With the forward movement of the plunger 19, the blocks 26 and the blocks 33 can move forwardly and extend the springs 27 and 35 into tension. Consequently when the half-nut is relieved of threaded engagement with the screw 20, the springs 27 acting on the blocks 26 immediately pull the plunger 19 backward to retracted position, the key way 21 and key 22 allowing of this action.

As the plunger 19 moves backward, the curtain 29 is pulled by the spring 31 and clears the space between the container 9 and the cutting chamber 13.

Just as the plunger 19 reaches its most retracted position, a cam surface 75 on the inside of the plunger engages a cooperating cam surface 76 on the half-nut 69. This again presses the half-nut 69 into threaded engagement with the threads of the screw 20. With the retractive movement of the plunger the frame 74 and strike lug 73 have been drawn out of engagement with the detent 72 and the spring 72a thereof then pulls such detent back into holding engagement with the half-nut 69.

The space between the container 9 and the cutting chamber 13 having been thus opened, the bulk butter B in the container 9 is pressed down by the weight 11 so that such butter projects from the container 9 into the chamber 13.

The weight of this butter presses on the trip plate 44 causing the lip 43 to engage the element 42 and swing the lever 41 about its pivot 41a. The action of this lever forces the links 38 upward and this action releases the detents 36 from engagement with the blocks 33.

Thereupon the springs 35 which are under tension, pull the blocks 33 backwardly along the rods 24 and 25. This action pulls the cutting wire 34 through the bulk butter B projecting from the container 9 into the chamber 13 and cuts and leaves a segment thereof in the chamber 13.

As will be noted the chamber 13 projects forwardly beyond the container 9 and in order to bring the segment of butter thus cut out to a position immediately adjacent the forward end of the chamber 13 so that it will be sliced and to do this without bringing the slicing mechanism into operation, it is necessary that the plunger 19 independently advance such segment to this position before the slicing and dispensing mechanism is called into play. This short advancing movement of the segment is accomplished in the following manner:

The switch D in the motor circuit (see Fig. 3) is normally an open switch. When however, the blocks 33 move backward as described above, a slide bar 77 rides on the switch lever 78 and closes the switch D and starts the motor. The length of the bar 77 is such that the motor remains in operation just long enough to cause the plunger to engage and move the cut butter sections to a position immediately adjacent the forward end of the chamber 13. Thereupon the slide 77 leaves the switch lever 78 and the switch D again opens and stops the motor. The butter segment is now in position to be advanced progressively for the slicing operation in the manner which will presently be described.

The distance between the strike lugs 68 and 62 is such that when the plunger 19 has made the short forward movement described immediately above, the extension 26a of the blocks 26 have been moved from engagement with the strike lug 68 into engagement with the strike lug 62. The engagement of the two latter elements functions to cause the lever finger 61 to rotate the pin 60 and then turn the detent 59 out of engagement with the collar 57. Thereupon the spring 55 forces the clutch collar 54 into engagement with the clutch 53 so that the gear 51 is then in driving relation with the shaft 52.

At this time both the switches C and D are open so that the motor is not running and there is no driving of the shaft 52 until the motor is energized for the butter slicing operation as will be described.

On the outer end of the shaft 52 is fixed a counter weighted gear rack 79 which with the rotation of the shaft 52 intermittently drives a small gear 80. The gear 80 is driven one complete revolution with one complete revolution of the shaft 52 accompanied by a complete corresponding revolution of the rack 79. The gear 80 is journaled in the sub-frame 14 adjacent and outside of one upper corner of the chamber 13. Fixed to said gear is a quadrant 81 having a finger 82 normally engaging a snap spring 83 to hold the gear and quadrant in fixed position during the free movement of the rack 79.

The side of the quadrant 81 which lies immediately above the chamber 13 when the quadrant is quiescent comprises a slicing wire 84. When the quadrant 81 is moved one complete revolution with the revolution of the gear 80, this slicing wire cuts through any portion of the butter segment which protrudes beyond the open end of the chamber 13, such cut portion comprising the slice of butter to be dispensed.

The butter segment in the chamber 13 may be progressively advanced to provide for the cutting off any selected number of butter slices at any one operation and this number may be determined by the operator of the machine through the medium of certain control mechanism which will now be described.

Mounted in the main frame 1 are a selected number of key levers 85 having the key portions 86 thereof protruding outwardly through the front of the main frame 1. (See Figs. 1 and 25-30 inclusive). These levers are held in normal position by pull springs 87 and the extent of movement of the levers is determined by the setting of set screws 88.

The movement of these levers functions to determine the amount of movement of the plunger 19 to progressively move the butter segment in the chamber 13 beyond the open end of such chamber according to the number of slices to be cut in any given operation. The desired number of slices which can be determined through the manipulation of the levers 85 is indicated by numbers on the key portions of such levers as shown in Fig. 1. In this figure I have shown three of the finger portions. Each of these can be set to allow a different number of slices to be selected and as shown in the particular machine here disclosed. Any number of slices up to fifteen may be selected. This can be done by striking the key portions one after the other to total up to the desired number of slices. No two finger portions should be struck simultaneously.

Since the operation of these slicing control levers is identical other than for multiplying the number of slices to be selected, I will describe the operation of but one lever and it will be understood that the others all operate according to the same principle.

When no slicing is being carried out, the switch C is normally held open by means of a strike lug 89 mounted on a wheel 90. This wheel 90 is mounted for free rotation on a shaft 91. It has a projecting stop finger 92 which is normally held against a stop pin 93 by means of a coiled tension spring 94. This spring 94 is fixed at its inner end to part of the frame work of the main frame 1 as at 95 and at its other end is fixed at the inner periphery of the wheel 90 as at 96. When thus held in its normal position the strike lug 89 is engaged with a switch button 97 of the switch C and the switch is open and the motor M is not running.

Fixed to the wheel 90 is a sleeve 98 which is turnable on the shaft 91. On the sleeve 98 are a number of small gears 99, one for each lever 85. On the inner end of each lever 85 is a gear rack 100, each of such racks being adapted to engage a corresponding gear 99 but being normally held out of engagement therewith by the action of the springs 87. The gear teeth on each gear rack correspond to the number of slices which may be selected by the depression of one of the finger portions 86.

Upon a depression of one of the finger portions 86 the corresponding lever carries its gear rack into engagement with the corresponding gear 99 and rotates that gear and the wheel 90 a distance permitted by the extent of gear engagement and consequently turns the wheel 90 the same distance and places the spring 94 under tension.

Fixed on the end of the sleeve 98 opposite that end on which the wheel 90 is disposed is a ratchet wheel 101 having equally spaced ratchet teeth 102 thereon. A lever 103 is pivotally mounted on a portion of the main frame 1 and carries a spring pulled detent 104 which progressively engages the ratchet teeth 102 with the rotation of the wheel 90 and consequently the ratchet wheel 101 and holds the wheel 90 against retractive movement except as the ratchet teeth are progressively released from the detent through operation of the lever 103.

The release of each ratchet tooth is effected upon the completion of the cutting of a slice of butter at the end of the chamber 13 as will appear.

When the wheel 90 is rotated with the rotation of one of the gears 99 the strike lug 89 is of course, carried out of engagement with the switch button 97 and the switch C opens and the motor starts. This drives the gear 23 to advance the plunger 19 in the manner described, and this advancement of the plunger 19 moves the butter forwardly out of the chamber 13.

Synchronously with the movement of the plunger the gear 51 drives the shaft 52 and with each revolution of each shaft the cutting wire 84 cuts off a slice of butter.

With each revolution of the shaft 52 a cam 105 which is fixed to said shaft engages the free end of the lever 103 and operates it to release the detent 104 from one of the ratchet teeth 102. As soon as one tooth is released the spring 104a pulls the lever back so that the detent 104 catches the next ratchet tooth. Thus when a number of slices of butter have been cut which correspond to the number of ratchet teeth advanced beyond the detent 104 the strike lug 89 has been returned by the spring 94 into engagement with the switch button 97. This opens the switch C and stops the motor. With the retractive movement of the wheel 90, the gear 99 which has been engaged to cause the forward action re-meshes with the gear rack 100 which had initiated the movement and carries it and the corresponding lever 85 back to initial position.

Fixed to the shaft 52 (see Figs. 2, 3, 18, 19 and 20), is a gear 106. This gear meshes with another gear 107 on a shaft 108 suitably journaled in the sub-frame 14. On the bottom of the shaft 108 is a sprocket wheel 109 connected by a chain 110 with another sprocket gear 111 journaled near the forward end of the sub-frame 14 and mounted on which is a turn table 112 of relatively wide diameter. This turn table projects forwardly of and below the open front end of the cutting chamber 13.

This turn table 112 is adapted to carry butter plates 113 progressively and in single file below the open end of the butter chamber 13 so that one plate will move adjacent thereto as each butter slice is cut so that the slice will fall into the plate. An elongated channel 114 is provided in the bottom of the sub-frame 14 and extends from end to end thereof and is adapted to receive a stack or package 115 of the butter plates 113. When in the channel 114 the stack 115 is held by a spring press follower 116 against a spring holding lip 117 adjacent the front open end of the channel 114.

A gear 118 is fixed on the shaft 52 and drives another gear 119 on a shaft 120. On a shaft 120 is mounted a picker cam finger 121 which rotates in timed relation with the butter slicing quadrant to pick off a plate 113 from the stack 115 and deposit it on the turn table 112 which carries it to a position immediately below the open end of the chamber 13 where it catches the slice of butter as it falls.

The continued rotation of the turn table 112 then carries the plate with the butter slices on it to a dispensing counter 122 which has a feathered edge 123 mounted in close engagement with the top surface of the turn table 112 whereby as the butter plate 113 reaches that point it will slide up and on to the dispensing counter 122, each plate progressively moving those ahead of it along the counter. From the counter 122 the operator may remove the plates with the butter thereon and dispense them as desired.

The cycles of operation described above will be repeated of course each time one of the finger portions 86 is depressed, the machine running until the desired number of slices are cut and dispensed and then stopping.

Since the sub-frame 14 is removable from the main frame 1 for the purpose of cleaning and repair, and carries some of the electrical wiring, it is necessary to provide conventional make and break plug sockets between the two. For illustration, these are shown at F, Fig. 31.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined in the appended claims.

Having thus described the invention, the following is claimed as new and useful and upon which Letters Patent is desired:

1. A butter slicing device including a bulk butter container, a slicing chamber in register with the container, means to move the bulk butter from the container into the chamber, a plunger movable through the chamber, a pair of guides, the members thereof lying respectively on opposite sides of the chamber, a second pair of guides, the members thereof lying respectively on opposite sides of the first pair of guides, blocks on the plunger slidable on the first pair of guides, tension springs connected to such blocks and which are placed under tension with the advancement of the plunger, other blocks slidable on the guides, tension springs connected with said other blocks, said other blocks being engageable by the first named blocks with the advancement of the plunger, means to releasably hold said other blocks at the forward end of the chamber, means responsive to the movement of the butter into the chamber to release said other blocks, and a butter cutting element on said other blocks which, upon release of said blocks, will be drawn through the butter by movement of said blocks under the tension of the springs connected therewith, whereby to cut a segment from the bulk butter.

2. A butter slicing device including a slicing chamber adapted to receive a segment of butter, a plunger operative to move the segment through the chamber, means to cut slices from the segment simultaneously with its movement through the chamber, a motor to operate the plunger and slicing means, and manually operated means to which the motor is responsive to cause the latter to operate the plunger and cutting means to cut a selected number of slices from said segment at any one operation of the device.

3. A butter slicing device including a slicing chamber adapted to receive a segment of butter, a plunger operative to move the segment through the chamber, means to cut slices from the segment simultaneously with its movement through the chamber, a motor to operate the plunger and slicing means, an electrical circuit controlling the operating of the motor and including a normally open switch, and manually controlled means to selectively close said switch for a predetermined period of time whereby said motor will operate the plunger and cutting means until a selected number of slices of butter have been cut from the segment.

4. A device as in claim 3 in which said manually controlled means includes a spring pressed cam wheel having a cam normally engaged with the switch to hold it open, a gear wheel on the cam shaft, a finger operated lever, a gear rack on the lever, said rack having a selected number of teeth thereon engageable with the gear wheel upon operation of the lever to turn the cam wheel a distance determined by the number of teeth on the rack and disengage the cam from the switch whereupon the latter closes and sets the motor in motion, and means responsive to the action of the slicing means to return the cam wheel to cam engaging contact with the switch when such predetermined number of slices have been cut from the segment.

5. A butter slicing device including an open ended slicing chamber, means to move a segment of butter through the chamber and out the open end thereof, means to cut slices from the segment as it is moved, such latter means comprising a quadrant pivoted at its apex at a point adjacent one side of the chamber and above the same, one side of the quadrant comprising a cutting wire normally extending across the plane in which the upper side of the chamber lies and adapted upon movement of the quadrant to move across the open end of the chamber, a gear on the apex of the quadrant, a driven revoluable gear rack intermittently engaging the gear and operable to impart one complete revolution of the quadrant with each complete revolution of the rack, and friction means to hold the quadrant stationary in its normal position above the chamber during the period in which the rack is disassociated from the gear.

6. A butter slicing device including a slicing chamber, a plunger movable through the chamber, a propelling screw on the plunger extending longitudinally through the chamber, a driven gear mounted for rotation at a point adjacent the rear of the chamber, the screw being slidably keyed to the gear, a half-nut having threads for engagement with the screw, a spring means tending to move the nut to disengage its threads from the screw, a spring pulled detent engaging the nut to hold it in screw contact with the screw during desired forward movement of the plunger, means on the screw engageable with the detent to release it from the nut when the plunger reaches a predetermined position, and means to then retract the plunger.

7. A butter slicing and dispensing device including a bulk butter container, such container having an open bottom, a butter cutting chamber having an open end and an open top side, the latter being in register with the open bottom of the container, a slicing element adjacent the open end of the chamber, a butter plate magazine, means to dispense plates from the machine to a position adjacent the cutting element, a motive power means, and instrumentalities operatively connected with the power means to progressively admit bulk butter from the container to the chamber, to cut a segment of butter from the bulk, to advance said segment through the chamber, to operate the slicing means to cut a slice from the segment, to operate said plate advancing means to advance a plate to receive said slice and to remove the plate with the slice thereon to a dispensing point.

8. A device as in claim 7 and including in combination therewith means to selectively control the functioning of the motive power means whereby to selectively cut and dispense a predetermined number of slices of butter in any one cycle of operation of the device.

9. In combination, a bulk butter container, a slicing chamber, means to advance bulk butter from the container into the chamber, means to cut a segment from the bulk butter at a point intermediate the container and chamber, means including a plunger to advance the segment through and out of the chamber, means to cut slices from the segment as it is advanced out of the chamber, a screening curtain secured at one end of the plunger at the top thereof, and means guiding such curtain for movement between the bulk butter and the segment with the advancing movement of such plunger.

10. A butter slicing device including a bulk butter container, a slicing chamber, means to move a portion of the bulk butter from the container into the chamber, a cutting element normally held above the chamber adjacent one end thereof, means to draw the cutting element through the bulk butter after the said portion thereof has been moved into the said chamber whereby to sever said portion from the remainder of the butter, such element drawing means including a tension spring connected at one end to the element and anchored at the other end at a point adjacent the end of the chamber opposite that end at which said element is normally held, such springs being normally under tension and thereby operable to pull the element through the butter when such element is released from its normal held position, and means to so release the element.

11. A butter slicing device comprising a butter segment containing chamber, means to predetermine a selective number of slices to be cut from such segment; means controlled by the first means to then automatically advance the segment longitudinally through and out of the chamber and to cut it into slices as such segment is advanced, and means to automatically discontinue the operation of the segment advancing means and the cutting means when such predetermined number of slices have been cut.

12. A butter slicing device comprising a butter segment containing chamber, means to move such segment through and out of the chamber, means to cut slices of butter from the segment as it is moved out of the chamber, a plate-like turn table rotatable immediately below the discharge end of the chamber, a substantially horizontal channel for containing a plurality of butter plates in nested backwardly sloping order, such channel opening adjacent the turn table, and a rotary downwardly turning picker cam operable to engage in the foremost plate in the channel so as to feed such plate forwardly and downwardly and deposit it on the turn table, said turn table and said cam being operably connected with the segment advancing and slicing means and in timed relation thereto whereby a plate will be deposited on and carried by the turntable to a point below the discharge end of the chamber each time a slice of butter is cut from the segment by the cutting means.

WALTER R. SCHARSCH.

REFERENCES CITED

The following references are of record in the file of this patent:

UNITED STATES PATENTS

| Number | Name | Date |
|---|---|---|
| 1,165,716 | Schaefer | Dec. 28, 1915 |
| 1,216,624 | Straight | Feb. 20, 1917 |
| 1,399,768 | Hartung | Dec. 13, 1921 |
| 1,425,711 | Stewart | Aug. 15, 1922 |
| 1,534,418 | Slaten | Apr. 21, 1925 |
| 1,580,498 | Knox et al. | Apr. 13, 1926 |
| 1,679,583 | Ninnis | Aug. 7, 1928 |
| 1,703,553 | Slaten | Feb. 26, 1929 |
| 1,758,257 | Kaskouras | May 30, 1930 |
| 2,260,747 | Heft et al. | Oct. 28, 1941 |
| 2,302,371 | Heft | Nov. 17, 1942 |